INVENTORS M. F. SLANA
H. A. WAGGENER
BY
R. C. Winter
ATTORNEY 3,504,131
SWITCHING NETWORK
Matthew F. Slana, Naperville, Ill., and Herbert A. Waggener, Allentown, Pa., assignors to Bell Telephone Laboratories, Incorporated, Murray Hill, N.J., a corporation of New York
Filed May 2, 1967, Ser. No. 635,497
Int. Cl. H04q 3/49, 3/50
U.S. Cl. 179—18 1 Claim

ABSTRACT OF THE DISCLOSURE

A switching network for a communication system is disclosed which includes an end-marked control network having photo-emissive breakdown devices such as PIN diodes at the crosspoints and a transmission network having photo-sensitive breakdown devices such as PNPN diodes at the crosspoints. A path hunting technique is utilized in establishing the control path through the PIN diodes which in turn establishes the transmission path via the optical coupling at the crosspoints. A holding bias in both control and transmission paths through the switching network maintains the established connections.

BACKGROUND OF THE INVENTION

In a typical communication system such as a telephone central office or private branch exchange, the switching network comprises a major portion of the system. It is through the switching network that the various lines and trunks served by the system are interconnected. Conventional switching networks employ electromechanical components such as crossbar switches, relays and reed devices. It is known, however, that a switching network made up entirely of solid state devices offers numerous advantages including small size and speed of operation. One of the problems with prior art all solid state networks, however, is that complex control circuits are required to establish and maintain transmission paths through the network. The power requirements of such arrangements are also significant.

One solution to the problem suggested by the prior art is to employ an optical coupling at the crosspoints between the control and transmission networks to establish the transmission path. Thus, as disclosed in the Belgium Patent 682,405 corresponding to M. F. Slana patent application, Ser. No. 495,156, filed Oct. 12, 1965, now abandoned, a photo-emitting diode at each crosspoint of the control loop in the switching network is effective when energized to enable a phototransistor at the corresponding crosspoint of the transmission loop. The transmission loop is maintained so long as the optical coupling is active and this, in turn, is assured by the use of PNPN diodes in series with the photo-emitting diodes in the control loop. The PNPN diodes, however, require a large breakdown voltage and a lower holding voltage in the control loop in order to establish and maintain a corresponding transmission loop. Such an arrangement tends to consume an inordinately large amount of power in the switching network.

SUMMARY OF THE INVENTION

In accordance with this invention the problems presented by a solid state approach to a switching network are solved by an arrangement which consumes relatively little power. A photo-sensitive PNPN diode is located at each crosspoint forming a transmission loop, while each crosspoint in the corresponding control loop is a photo-emissive PIN diode. The PIN diode requires a relatively small breakdown voltage and a minute holding voltage. Since breakdown of the PNPN diode in the transmission loop is achieved optically, the need for the relatively large breakdown potential normally required for its operation is obviated. The holding bias required in the transmission loop is relatively low. Thus the overall power consumption in the switching network is reduced significantly over that required in prior art systems of this type. The control network is first end-marked, with all available PIN diodes in the first stage of the network being enabled simultaneously. Similar action takes place in each succeeding stage of the control network in sequence such that, upon completion of the control loop, all previously inactive PIN diodes will have been enabled. Upon completion of the control path, however, the bias available to all PIN diodes not involved in the established control loop is reduced below their sustaining level and they are restored.

As each PIN diode in the control portion of the switching network is enabled, the corresponding PNPN diode in the transmission portion of the switching network is also enabled through the optical coupling. Here again all available PNPN diodes will be enabled and will remain in this condition until a transmission loop has been established. At this point the holding current begins to flow through the completed loop, thus maintaining the loop until the connection is released. The bias in the transmission loop is required since the optical coupling provided by the PIN diode receiving only a holding voltage in the control loop would be insufficient to maintain the corresponding PNPN diode in the enabled state.

DRAWING

Figure 1:
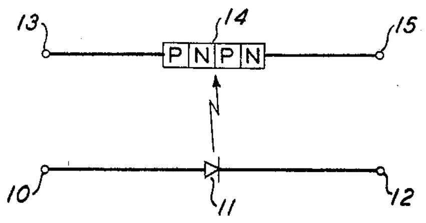
FIG. 1 represents a typical photon-coupled device.

Turning now to FIG. 1, the semiconductive unit 14 comprises a plurality of zones of opposite conductivity types forming at least three junctions, such elements being referred to in the art as PNPN diodes. Such a device exhibits at least one high impedance junction to current flow in either direction through the device, regardless of the direction in which the diode is poled. The PNPN diode will maintain its high impedance as long as the voltage across its terminals remains below a predetermined threshold value or a photo-sensitive junction is not energized. Once the low impedance is attained, the PNPN diode will remain in that state, provided that a second threshold value which is substantially below the first threshold value and near zero volts is maintained across the terminals of the PNPN diode. Removal of the second threshold level, which is often termed the interruption of the sustaining current, will cause the PNPN diode to revert to its original high impedance state. Thus the PNPN diode is well suited to perform the desired objective of essentially infinite impedance to the transmission of signals therethrough in either direction while in a high impedance state and essentially zero impedance to such transmission when in a low impedance state.

The semiconductive unit in FIG. 1 also comprises a plurality of zones of opposite conductivity types forming at least two junctions, such elements being referred to in the art as PIN diodes and disclosed, for example, in J. M. Early Patent 2,767,358, issued Oct. 16, 1956. These devices can be utilized as photo-emitters and have the same two impedance characteristic as the PNPN diodes. However, the breakdown and holding voltages are much lower than the corresponding voltages for the PNPN diodes. Thus the PIN diode serves applicants to advantage in the control path of a switching network.

In the photon-coupled device of FIG. 1 in the absence of a control current between terminals 10 and 12 no signal current can flow between terminals 13 and 15 because PNPN diode 14 does conduct in the absence of light from PIN diode 11. However, when a control current flows through PIN diode 11, it emits photons which impinge on the photo-sensitive region of PNPN diode 14. The PNPN diode then effectively presents a short circuit to terminals 13 and 15, and signal currents can now flow in either direction between these two terminals.

Figure 2:
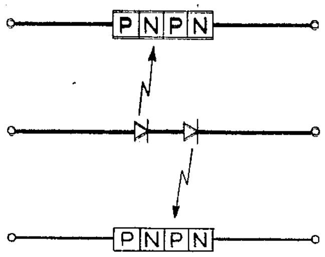
FIG. 2 represents a crosspoint device, in accordance with the principles of the invention, which may be constructed by using two of the devices of FIG. 1.

The device of FIG. 2 is made up of two of the devices shown in FIG. 1. The two control paths, i.e., the two PIN diodes, are connected in series. Each of them emits photons which strike a respective PNPN diode. Thus when a control current flows through the PIN diodes, two signal paths are established. The PIN diodes do not conduct until the potential difference across the control path exceeds their breakdown voltage. At this time they conduct and effectively present a short circuit to the control current.

Figure 3:
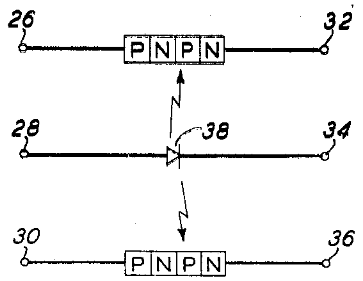
FIG. 3 shows the crosspoint device used in the illustrative embodiment of the invention.

The device of FIG. 3 is similar to that of FIG. 2 except that a signal PIN diode 38 is used. The photons emitted by this diode impinge on both PNPN diodes. When the potential difference between terminals 28 and 34 is sufficient to break down PIN diode 38 a control current flows through it, causing photo-emission. The light emitted by the PIN diode forward biases both PNPN diodes, and effectively terminals 26 and 32 and terminals 30 and 36 are shorted together.

Figure 4:
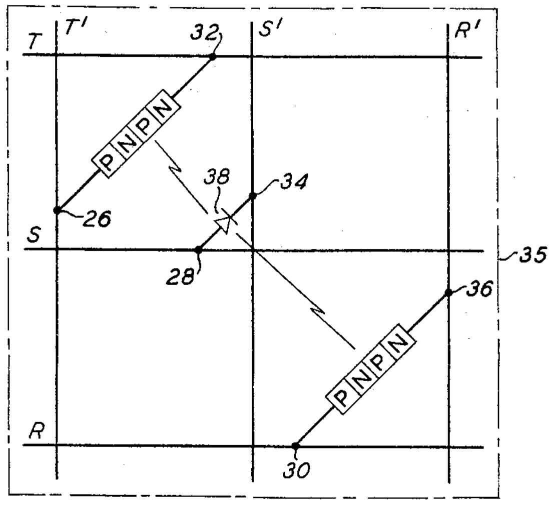
FIG. 4 shows how the crosspoint device of FIG. 3 is connected in a switching network in accordance with the principles of the invention.

FIG. 4 shows how the device of FIG. 3 can be used as a crosspoint 35 in a switching network. The horizontal conductors T, S and R (tip, sleeve and ring) intersect the vertical conductors T′, S′ and R′. The six-terminal crosspoint device is connected as shown to the six conductors. If potentials are applied to conductors S and S′ such that the potential of conductor S exceeds that of conductors S′ by at least the breakdown voltage of PIN diode 38, current flows from conductor S to conductor S′ through PIN diode 38. The voltage difference between conductors S and S′ can then be reduced since the voltage required to sustain conduction in the PIN diode is less than the breakdown voltage. Light emitted by the PIN diode forward biases both PNPN diodes and effectively conductors T and T′ are shorted together as are conductors R and R′. Current signals in the tip and ring conductors in no way affect the sleeve control current because there is no coupling from the PNPN diodes to the PIN diode. As long as control current flows in the sleeve conductors and the talking path, both paths remain established.

Figure 5:
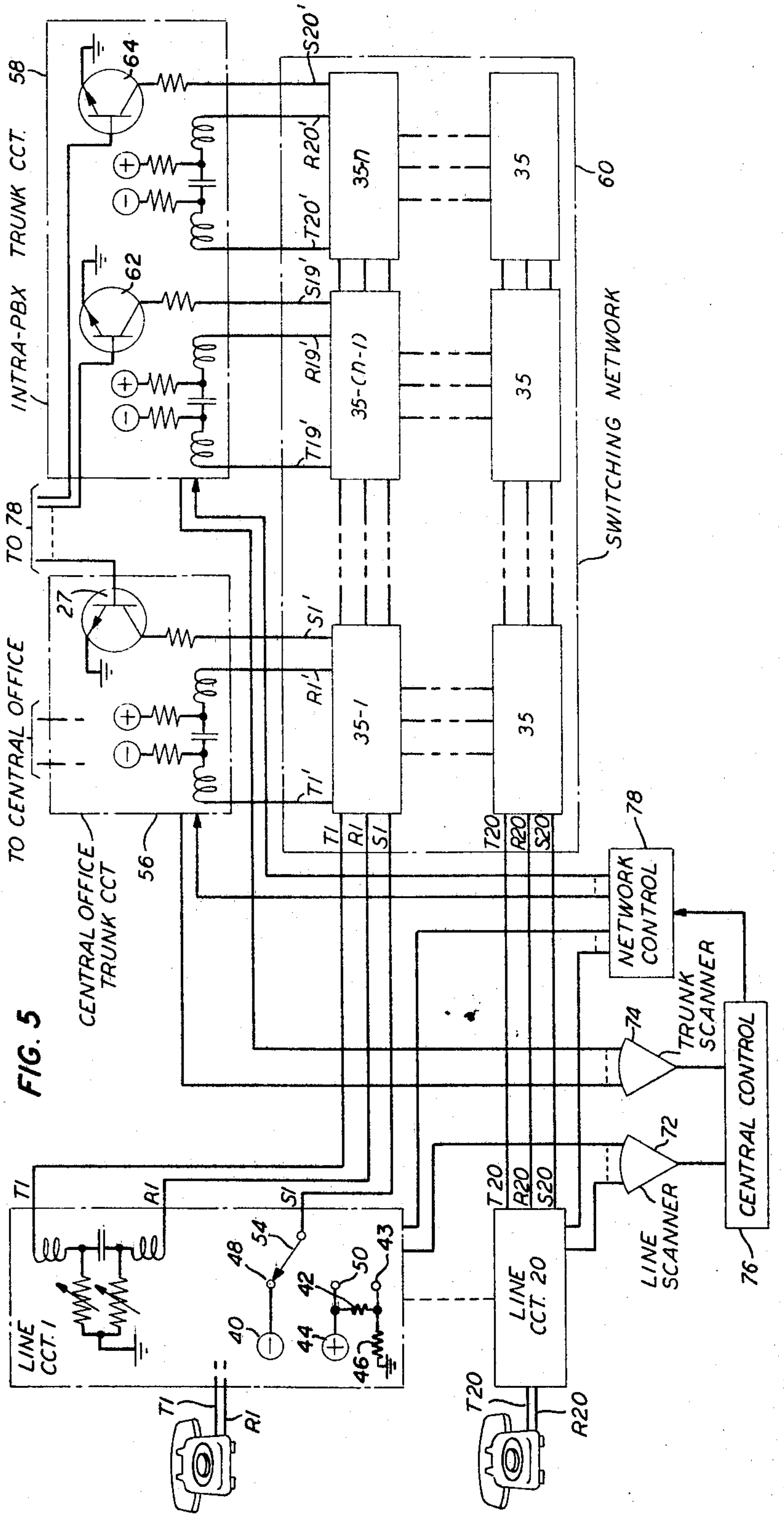
FIG. 5 shows how a switching network including many crosspoints of the type shown in FIG. 4 may be incorporated in a telephone installation such as a private branch exchange.

FIG. 5 is a block diagram schematic of a private branch exchange whose switching network 60 includes 400 crosspoints of the type shown in FIG. 4. Twenty horizontal groups of three conductors each couple line circuits 1 through 20 to the switching network and twenty vertical groups of three conductors each couple various trunk circuits to the switching network. Some of the trunk circuits in the system, of which only trunk 56 is shown, are extended to a central office for connecting a PBX subscriber to the office. Other trunks, of which only intra-PBX trunk 58 is shown, are used to connect two PBX subscribers to each other. Each of these trunks hase connected to its two groups of vertical conductors, the tip and ring conductors in each group being transformer coupled in the trunk circuit in order that a talking path be established between two PBX stations.

The line circuits and the trunk circuits include various equipments, not shown but well understood in the art, for performing the functions required of these circuits. The system operation is governed by central control 76. Line scanner 72 determines the supervisory status of the various line and dial pulse information received from the respective subscribers, and transmits this information to central control 76. Similarly, trunk scanner 74 determines the supervisory status of the various trunk circuits and transmits this information to central control 76. In accordance with information received by the central control, network control 78 transmits signals to the various line and trunk circuits to control their operations. The various units in FIG. 5 are not shown in detail inasmuch as they are well known in the art. What is shown in the drawing is the mechanism in a line circuit and the mechanisms in the two types of trunk circuits which provide the end-marking capability of the system for operating a particular crosspoint 35.

Suppose central control 76 determines that line circuit 1 must be connected to central office trunk circuit 56. Sleeve conductor S1 is initially held at the negative potential of source 40. Upon receipt of an appropriate control signal from network control 78, wiper 54 disconnects conductor S1 from source 40 and connects it to terminal 50 and positive source 44. (It is to be understood that the wiper shown in the drawing is symbolic only; well-known electronic circuitry can be used to perform the same function most advantageously.) Trunk circuit 56 upon receipt of the appropriate signal from network control 78 causes transistor 27 to connect conductor S1′ to ground. Initially, with conductor S1 negative in potential and transistor 27 nonconducting, the PIN diode connected between the two conductors S1 and S1′ is reverse biased and no current flows through the crosspoint. However, when conductor S1 is made positive in potential and conductor S1′ is connected to ground through transistor 27, the potential difference across the PIN diode is sufficient to cause it to break down.

Current flows from conductor S1 to conductor S1′ through the PIN diode contained in the crosspoint 35–1 at the upper left-hand corner of switching network 60. With current flowing through the PIN diode, the PNPN diodes in the corresponding crosspoint are held by the bias provided when conductors T1 and T1′ and conductors R1 and R1′ are shorted together. In this manner, the station connected to line circuit 1 is connected through the switching network and the central office trunk circuit to the central office.

Wiper 54 continues to rotate in a counterclockwise direction after the crosspoint is operated to connect conductor S1 to terminal 43. Due to the voltage divider network comprising resistors 42 and 46 the positive potential of terminal 43 is smaller in magnitude than the magnitude of source 44. Consequently, although conductor S1 is still positive in potential and conductor S1′ is still at ground potential, the potential difference is less than that used to initially break down the PIN diode in the crosspoint. Since the sustaining voltage is less than the breakdown voltage, conductors S1 and S1′ are held at the smaller magnitude potentials for the remainder of the call. Holding current continues to flow through the sleeve and transmission conductors until the call is to be terminated.

When one of the line or trunk scanners notifies central control 76 that the call has been terminated, network control 78 sends appropriate signals to the line and trunk circuits. Wiper 54 returns to source 40 at terminal 48 and the variable resistance in the T1 and R1 paths at line circuit 1 is increased. In this fashion the holding potential for the PNPN switch in the crosspoint is reduced. When the holding current ceases, the PNPN diodes in the crosspoint no longer conduct, and the crosspoint is effectively opened. Transistor 27 then is deactivated.

The operation of intra-PBX trunk circuit 58 is similar to that of central office trunk circuit 56 except that transistors 62 and 64 operate in sequence, each of these operating in the same manner as transistor 27. Both transistors must operate in order that two crosspoints close. Conductors T19' and T20' are coupled together, through the transformer illustrated in the trunk circuit. Similar remarks apply to conductors R19' and R20'.

Figure 6:
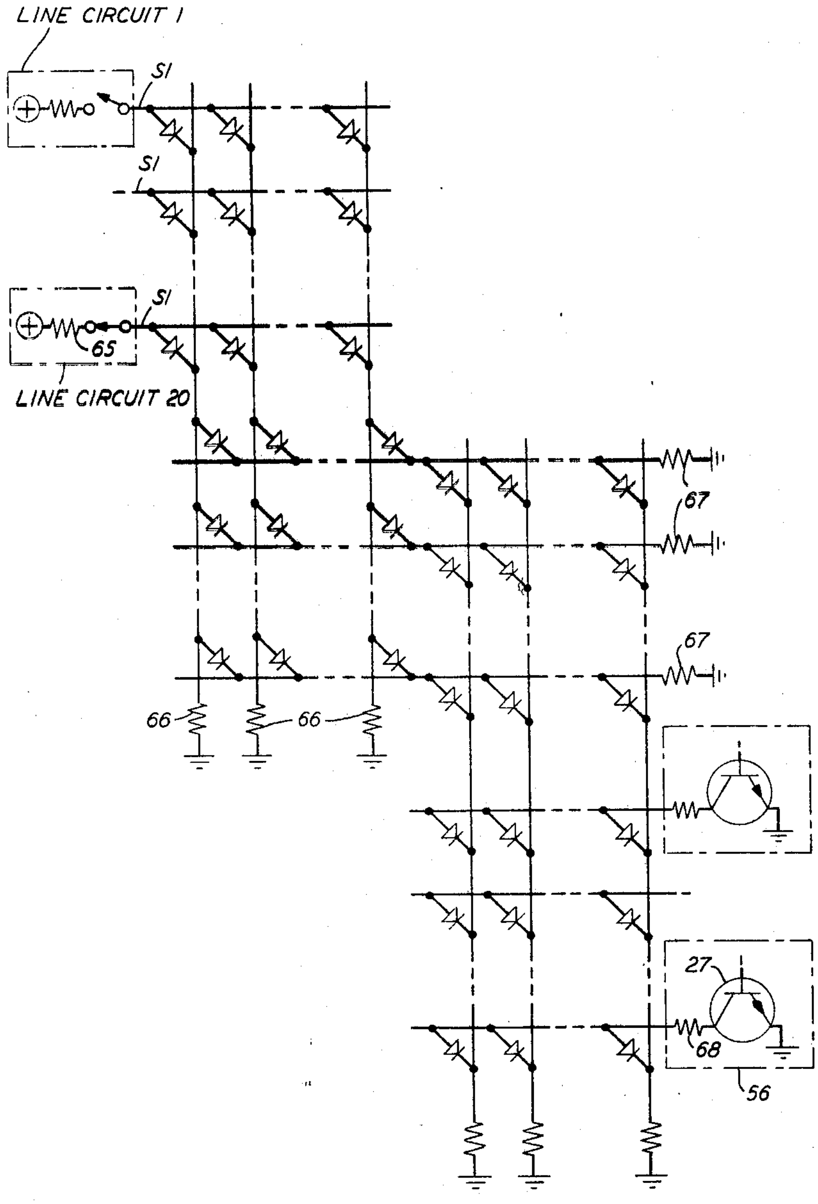
FIG. 6 shows the manner in which a control loop is established through a plurality of stages in the switching network depicted in FIG. 5.

Turning now to FIG. 6, the control paths through a multistage switching network are illustrated. A fan-out path selection is conducted in which all idle PIN diodes in each stage are enabled upon application of the breakdown potential at a particular line circuit. This is possible due to the presence of holding resistors connecting the PIN diodes in each link to ground. The operation may be understood by consideration of a typical call connection through the network between line circuit 20 and central office trunk circuit 56. At the outset the positive breakdown voltage source in line circuit 20 is connected to the network and ground is connected to the network at trunk circuit 56 through transistor 27. The result is the enablement of all of the PIN diodes in the first network stage to which line circuit 20 is connected, permitting them to conduct via a path through resistors 65 and 66 between the positive voltage source and ground. This results in a voltage drop in the first stage of the network which is insufficient to prevent breakdown of the second stage diodes via a path through resistors 65 and 67, since the value of each resistor 66 is much greater than the value of resistor 65. This action continues until the final stage is reached. Resistor 68, which is now introduced into the network path via operated transistor 27, decreases the voltage in the network below the level at which holding current can be supplied via resistors 66 and 67, so that the majority of the PIN diodes will be restored. However, a path will remain through the network involving a single PIN diode in each stage. This path, in turn, will control the corresponding talking loop.

Figure 7:
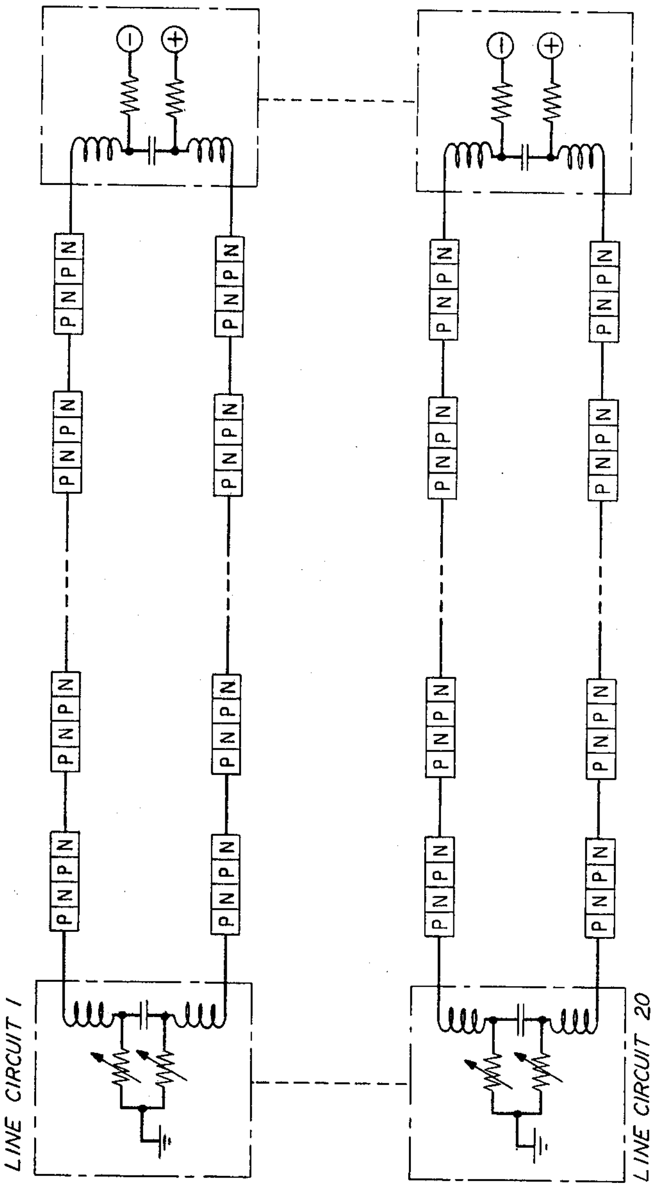
FIG. 7 indicates the manner of establishing the corresponding transmission loop in the network of FIG. 6.

FIG. 7 illustrates a single talking loop in the network which is under control of the path established in FIG. 6. As the PIN diodes in the control network are enabled, the corresponding PNPN diodes in the tip and ring leads of the talking loop are also enabled. However, due to the absence of holding resistors intermediate the stages of the network talking paths, only those PNPN diodes will remain operated which correspond to the PIN diodes in the established control loop.

Once the talking loop has been completed, the voltage source in the trunk circuit will establish holding current through the loop. Thus the need for the large voltages associated with PNPN diode breakdown are obviated by permitting breakdown through the optical coupling with the PIN diodes in the control network. The PIN diodes, of course, require a much lower breakdown voltage. Comparable prior network requirements were 25 milliamperes to hold a control path and 5 milliamperes of talking bias. Correspondingly, the instant system permits a network which requires 1 milliampere or less to hold the control path and 5 milliamperes to hold the talking path. Thus only one-fifth of the current (and hence the power) requirement of the prior system is required in the system in accordance with this invention.

It is to be understood that the above-described arrangement is illustrative of the application of the principles of the invention. Numerous other arrangements may be devised by those skilled in the art without departing from the spirit and scope of the invention.

What is claimed is:

1. A multistage switching network wherein each of said stages comprises a plurality of horizontal speech and control conductors and a plurality of vertical speech and control conductors, said horizontal and vertical speech conductors being arranged in matrix arrays having a plurality of crosspoints each of which includes an intersection of vertical and horizontal speech conductors, a light responsive diode having a high breakdown voltage at each of said speech matrix crosspoints, said horizontal and vertical control conductors being arranged in a matrix array having a plurality of crosspoints each of which includes an intersection of horizontal and vertical control conductors, a light-emissive diode having a lower breakdown voltage at each said control matrix crosspoint, each of said lower breakdown voltage light-emitting diodes being optically coupled to a higher voltage light-responsive diode whereby an energized path through the control matrices can control a speech path through the speech matrices,
   means for end-marking a control path, said end-marking means including means for enabling all of the inactive light-emissive diodes available to that path in all stages of the network but the last and for establishing a holding path through the last stage for only a selected one of the enabled light-emissive diodes, and
   means for circulating a bias current through the light-responsive diodes coupled to the light-emissive diodes in the marked control path upon breakdown of the high breakdown voltage speech path diodes to hold the speech diodes in the speech path in the enabled state.

References Cited

UNITED STATES PATENTS

| | | | |
|---|---|---|---|
| 3,201,764 | 8/1965 | Parker | 340—166 |
| 3,226,486 | 12/1965 | Benmussa et al. | |
| 3,268,733 | 8/1966 | Peelman et al. | 250—217 |
| 3,321,745 | 5/1967 | Mansuetto et al. | 340—166 |
| 3,349,186 | 10/1967 | Bereznak. | |
| 3,304,429 | 2/1967 | Bonin et al. | 250—217 |
| 3,410,961 | 11/1968 | Slana. | |

OTHER REFERENCES

E. Keith Howell: "Light Activated Switch . . . "; Electronics; May 4, 1964, vol. 37, No. 15, pp. 53–61.

KATHLEEN H. CLAFFY, Primary Examiner

WILLIAM A. HELVESTINE, Assistant Examiner

U.S. Cl. X.R.

340—166